US011285948B2

(12) United States Patent
Schwartz et al.

(10) Patent No.: US 11,285,948 B2
(45) Date of Patent: Mar. 29, 2022

(54) WORK MACHINE SPEED CONTROL BRAKING

(71) Applicant: Caterpillar Inc., Deerfield, IL (US)

(72) Inventors: Timothy D. Schwartz, East Peoria, IL (US); Russell J. Pugh, Chester-Le Street (GB); David R. Wisley, Darlington (GB)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 16/417,164

(22) Filed: May 20, 2019

(65) Prior Publication Data
US 2020/0369280 A1 Nov. 26, 2020

(51) Int. Cl.
*B60W 30/18* (2012.01)
*B60T 8/18* (2006.01)
(Continued)

(52) U.S. Cl.
CPC ....... *B60W 30/18109* (2013.01); *B60T 8/171* (2013.01); *B60T 8/176* (2013.01); *B60T 8/18* (2013.01); *B60T 8/245* (2013.01); *B60T 8/32* (2013.01); *B60W 40/13* (2013.01); *B60W 2300/17* (2013.01); *B60W 2510/0657* (2013.01); *B60W 2520/10* (2013.01); *B60W 2520/105* (2013.01); *B60W 2520/28* (2013.01);
(Continued)

(58) Field of Classification Search
CPC .......... B60W 30/18109; B60W 40/13; B60W 2552/15; B60W 2300/17; B60W 2510/0657; B60W 2520/10; B60W 2520/105; B60W 2520/28; B60W 2530/10; B60W 2710/0605; B60W 2710/0627; B60W 2710/18; B60T 8/171; B60T 8/176; B60T 8/18; B60T 8/245; B60T 8/32
See application file for complete search history.

(56) References Cited

U.S. PATENT DOCUMENTS 4,743,072 A 5/1988 Brearley
5,494,345 A 2/1996 Inagaki et al.
(Continued)

FOREIGN PATENT DOCUMENTS

| CN | 102019927 | 4/2015 |
| CN | 104590038 | 11/2016 |
| WO | 2018215135 | 11/2018 |

*Primary Examiner* — Tyler J Lee
*Assistant Examiner* — Yufeng Zhang
(74) *Attorney, Agent, or Firm* — Schwegman, Lundberg & Woessner

(57) ABSTRACT

A machine includes an engine, a brake system, a speed sensor, a grade sensor, a load sensor, and a controller. The controller is configured to: determine a grade force based on the weight of the machine and the grade at which the machine is disposed; determine a deceleration force based on a target deceleration and the weight of the machine; monitor the speed at which the machine is traveling; determine an actual deceleration of the machine based on the monitored speed at which the machine is traveling; determine a deceleration error based on a difference between the actual deceleration and the target deceleration; determine a force correction based on the deceleration error; and control the brake system to apply a total brake force equal to the sum of the grade force, the deceleration force, and the force correction.

30 Claims, 3 Drawing Sheets

(51) Int. Cl.
  *B60T 8/32* (2006.01)
  *B60T 8/171* (2006.01)
  *B60W 40/13* (2012.01)
  *B60T 8/176* (2006.01)
  *B60T 8/24* (2006.01)

(52) U.S. Cl.
  CPC ..... *B60W 2530/10* (2013.01); *B60W 2552/15* (2020.02); *B60W 2710/0605* (2013.01); *B60W 2710/0627* (2013.01); *B60W 2710/18* (2013.01)

(56) References Cited

U.S. PATENT DOCUMENTS

| | | |
|---|---|---|
| 9,871,476 B2 | 1/2018 | Chen et al. |
| 9,938,907 B2 | 4/2018 | Hellemann |
| 2004/0046652 A1* | 3/2004 | Yokoyama ............... B60T 17/22 340/454 |
| 2013/0226386 A1* | 8/2013 | Kawai .................... B60W 20/00 701/22 |
| 2013/0297156 A1* | 11/2013 | Hansen ................. B60W 20/20 701/51 |
| 2014/0249729 A1* | 9/2014 | Schwartz ................ B60T 7/122 701/70 |
| 2014/0371956 A1* | 12/2014 | Jenkins ................... B63B 21/56 701/3 |
| 2015/0167614 A1 | 6/2015 | Malone et al. |
| 2015/0204259 A1* | 7/2015 | Hase ..................... F02D 41/123 701/112 |
| 2017/0151946 A1 | 6/2017 | Shiga et al. |
| 2018/0072290 A1 | 3/2018 | Boethel et al. |
| 2020/0156602 A1* | 5/2020 | Wiehen ..................... B60T 7/12 |
| 2020/0262399 A1* | 8/2020 | Yokoyama ................ B60T 8/172 |
| 2020/0346661 A1* | 11/2020 | Ryuzaki ................. F16D 48/06 |

* cited by examiner

WORK MACHINE SPEED CONTROL BRAKING

BACKGROUND

During machine operation, a quick controlled stop may need to be performed automatically, for example, if an operator is unaware of an obstacle in their path. The machine must be slowed to zero speed and held stationary, until the operator or other means of input can acknowledge safe stopping of the vehicle. This braking effort may need to occur on a variety of grades, and with an empty or loaded machine. Additionally, it may be desirable to control the deceleration in a way where the rate at which the machine is slowed stays common across operating conditions.

SUMMARY

A machine includes an engine, a brake system, a speed sensor configured to determine a speed at which the machine is traveling, a grade sensor configured to determine a grade at which the machine is disposed, a load sensor configured to determine a weight of the machine, and a controller in electrical communication with the engine, the brake system, the one or more retarding systems, the speed sensor, the grade sensor, and the load sensor. The controller is configured to: determine a grade force based on the weight of the machine and the grade at which the machine is disposed; determine a deceleration force based on a target deceleration and the weight of the machine; monitor the speed at which the machine is traveling; determine an actual deceleration of the machine based on the monitored speed at which the machine is traveling; determine a deceleration error based on a difference between the actual deceleration and the target deceleration; determine a force correction based on the deceleration error; and control the brake system to apply a total brake force equal to the sum of the grade force, the deceleration force, and the force correction.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
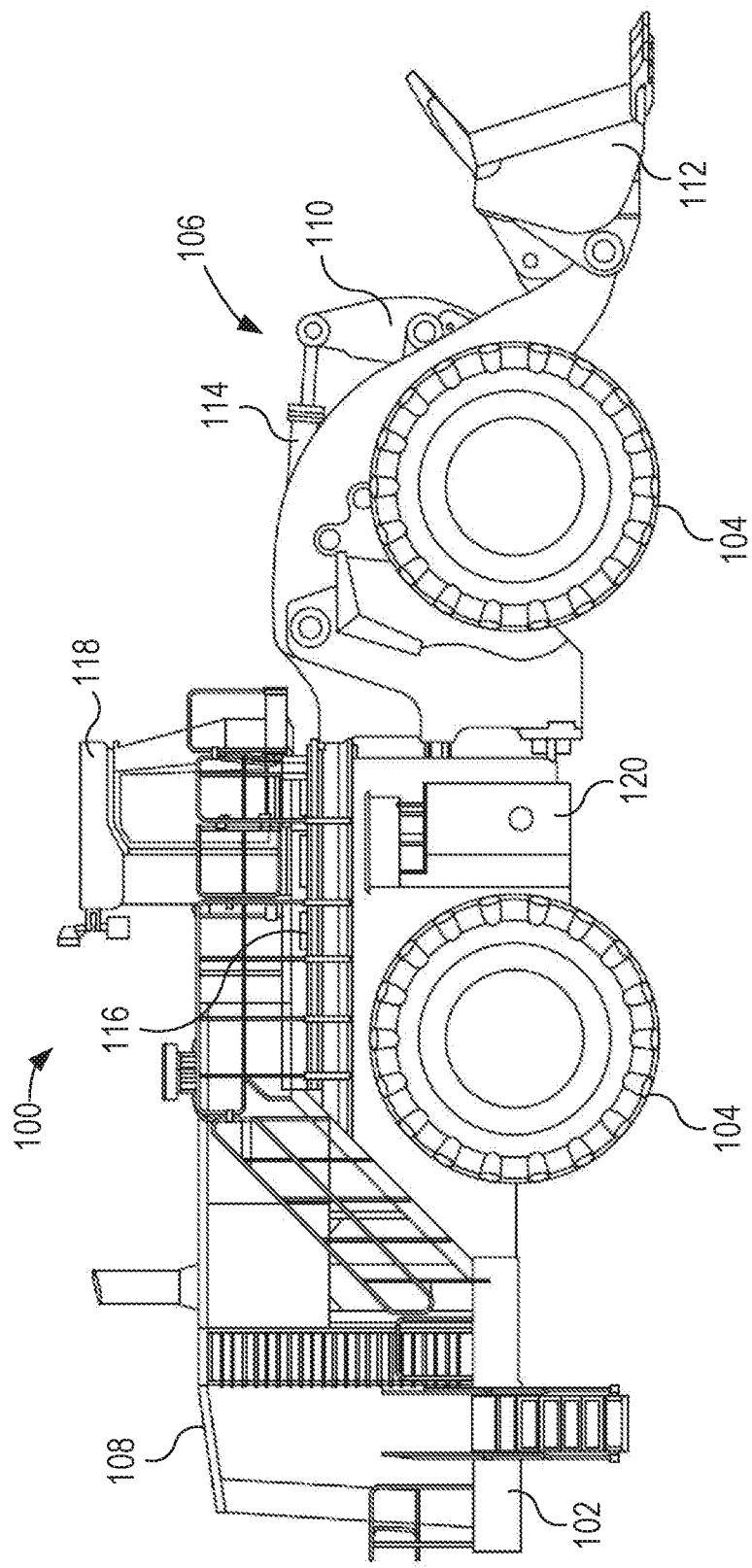
FIG. 1 is an elevation view depicting an example machine in accordance with this disclosure.

Examples according to this disclosure are directed to methods and devices for automatically controlling a moving work machine to decelerate to a stop. There are various circumstances in which such methods and devices may be advantageous. For example, the moving machine may be close to encountering and running into an obstacle. In such instances, whether the obstacle is detected by a function of the machine or by some external means, the methods and devices in accordance with this disclosure may be used to automatically stop machine motion and thereby avoid collision with the obstacle. As another example of circumstances in which methods and devices according to this disclosure could be used, it is possible that either the operator of the machine is unable or unwilling to operate the machine properly or that some part of the machine is malfunctioning. In such cases, example methods and devices of this disclosure could be initiated to automatically and safely slow the travel of the machine and bring the machine to a full stop, regardless of terrain condition and/or grade.

Examples according to this disclosure, in general, determine a total braking force that is required to slow a moving machine to a stop and automatically control braking systems of the machine (including, for example, service brakes and retarding systems) to apply the braking force to slow and stop the machine. In examples, a speed control system of the machine may be configured to determine the total braking force based on a number of different parameter inputs, from which one or more braking force terms are determined. As an example in accordance with this disclosure, the speed control system is configured to determine the total braking force as a sum of a feedforward braking force term (proportional term) and a closed loop braking force term (integral term). Additional factors that may modulate the total braking force applied by the speed control system can include the current propulsive force of the machine and the inherent resistance the machine has to traveling in the direction of travel (also referred to herein as rolling resistance).

In an example, the feedforward braking force term can be a function of two additional terms, including what will be referred to as grade force and deceleration force. The grade force can be a function of the force on the machine in the current conditions in which the machine is disposed, i.e. the force of gravity of the machine on a given grade of terrain. The grade force essentially accounts for and counteracts the environmental forces on the machine. The deceleration force is the amount of force required to slow the machine to a stop at a given target rate, or, in other words, at a target deceleration.

In an example, the speed control system can initiate a control sequence on the machine by controlling/commanding the braking systems to apply a total brake force equal to the feedforward braking force, which is equal to the grade force plus the deceleration force. However, the actual performance of the machine in slowing may vary from that expected and, as such, the speed control system can implement the closed loop braking force term to correct for such variations. As an example, the amount of force actually delivered by the braking systems may be different than that commanded by the speed control system. In such instances, the actual rate at which the machine is slowed will also diverge from the target deceleration and the closed loop braking force term can be used to account for such divergence to bring the actual deceleration of the machine closer to the target deceleration.

In an example, after initiating the control sequence by applying a braking force equal to the sum of the grade force and the deceleration force, the speed control system can calculate a correction force. The speed control system can monitor the speed of the machine (periodically or continuously) over time and calculate the actual deceleration of the machine. Additionally, the speed control system can determine a deceleration error by comparing the actual deceleration of the machine to the target deceleration. After determining the deceleration error, the speed control system can determine a force correction term based on the deceleration error. The force correction is the closed loop braking force term that is used to correct for variations in the actual performance of the machine from that expected based on the grade force and deceleration force applied in the initiation of the control sequence.

In an example, the speed control system continues the control sequence on the machine by controlling/commanding the braking systems to apply a total brake force equal to the feedforward braking force plus the closed loop braking force, which is equal to the sum of grade force, the deceleration force, and the force correction. As the machine is slowed to a stop, the force correction calculation is repeated by the closed loop control of the speed control system and the total braking force applied by braking systems is thereby modulated to apply the appropriate amount of force to slow the machine at the target deceleration.

As noted, the speed control system is monitoring the speed of the machine over time and can be configured to detect when the machine has slowed to zero speed (i.e. detect when the machine has come to a stop). After detecting that the machine has slowed to a stop, the speed control system can be configured to further modulate the total braking force applied by the braking systems, as the force required is less than that required when the machine is moving. In an example, after detecting that the machine has slowed to zero speed, the speed control system is configured to control/command the braking systems to apply a total braking force equal to the grade force.

After the speed control system detects that the machine has slowed to a stop and applies the grade force to maintain the machine safely at a stop, the system may require operator acknowledgement/input to restart movement of the machine. As an example, the operator may be required to change gears, e.g., placing the machine in a parking gear and then selecting a forward or reverse gear. As another example, the operator may be required to reselect throttle by depressing the throttle, releasing, and then depressing the throttle a second time to commence movement of the machine.

FIG. 1 depicts an example machine 100 in accordance with this disclosure. In FIG. 1, machine 100 includes frame 102, wheels 104, implement 106, and a speed control system implemented in one or more on-board electronic devices like, for example, an electronic control unit or ECU. Example machine 100 is a wheel loader. In other examples, however, the machine may be other types of machines related to various industries, including, as examples, construction, agriculture, forestry, transportation, material handling, waste management, and so on. Accordingly, although a number of examples are described with reference to a wheel loader machine, examples according to this disclosure are also applicable to other types of machines including graders, scrapers, dozers, excavators, compactors, material haulers like dump trucks, along with other example machine types.

Machine 100 includes frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an engine and/or other drive system to propel the machine over various terrain via wheels 104. The engine can include various power generation platforms, including, for example, an internal combustion engine, whether gasoline or diesel.

Machine 100 includes implement 106 coupled to the frame 102 through linkage assembly 110, which is configured to be actuated to articulate bucket 112 of implement 106. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 114. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof.

Machine 100 can include a tank compartment connected to frame 102 and including fuel tank 120. Fuel tank 120 is fluidly coupled to the engine. Tank 120 is configured to store a fuel therein and serve as a source for supply of the fuel to the engine of machine 100. Machine 100 may also include other tanks, for example, to store and supply hydraulic fluid to implement 106 or other components of machine 100.

Machine 100 can be used in a variety of industrial, construction, commercial or other applications. Machine 100 can be operated by an operator in operator cabin 118. The operator can, for example, drive machine 100 to and from various locations on a work site and can also pick up and deposit loads of material using bucket 112 of implement 106. As an example, machine 100 can be used to excavate a portion of a work site by actuating cylinders 114 to articulate bucket 112 via linkage 110 to dig into and remove dirt, rock, sand, etc. from a portion of the work site and deposit this load in another location.

As machine 100 moves from various locations, the machine may be required to traverse various grades including downhill or decline grades. As the weight of machine 100 and the loads thereon can be large, application of the electro-hydraulic service brakes of machine 100 can cause rapid wearing of the brake system, especially when applying the brakes on a downhill grade. To extend brake life and to provide additional means of controlling speed, machine 100 can include a number of speed retarder systems, which are configured to retard the speed of the machine independent of use of the brakes to control machine speed.

As noted above, machine 100 includes a speed control system that is configured to automatically control the speed at which machine 100 moves and to automatically slow the machine to zero speed. Machine 100 includes the engine, the electro-hydraulic service brakes, the speed retarder system(s), and can also include a speed sensor to measure/determine a speed at which the machine travels, a grade sensor configured to measure/determine a grade at which the machine is disposed and a load sensor configured to measure/determine a load on the machine.

The speed control system of machine 100 is in electrical communication with the engine, the brake system, the retarding system(s), the speed sensor, the grade sensor, and the load sensor. The speed control system can also be in communication with other components of machine 100, including, for example, a transmission operatively coupled to the engine. The speed control system can be configured to determine a total braking force necessary to slow machine 100 to a stop (zero speed) and the control/command the service brakes and/or the one or more retarder systems to apply the braking force to the machine.

As an example, the speed control system is configured to determine a grade force based on the weight of the machine and the grade at which the machine is disposed. The speed control system is also configured to determine a deceleration force based on a target deceleration and the weight of the machine. The speed control system monitors the speed at which the machine is traveling. The speed control system determines an actual deceleration of the machine based on the monitored speed at which the machine is traveling. The speed control system determines a deceleration error based on a difference between the actual deceleration and the target deceleration. The speed control system of machine 100 determines a force correction based on the deceleration error. The speed control system controls at least one of the service brake system and the retarding system(s) to apply a total brake force equal to the sum of the grade force, the deceleration force, and the force correction.

Figure 2:
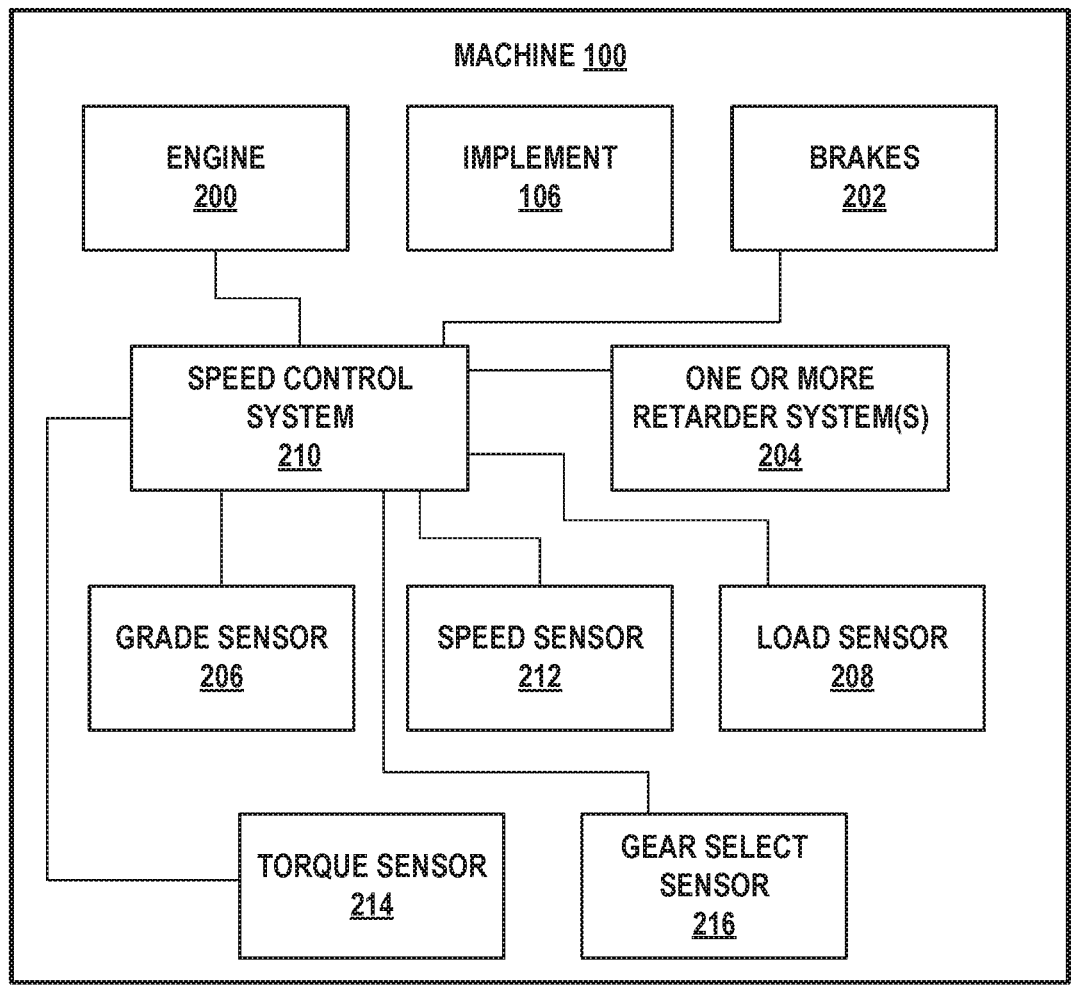
FIG. 2 is a block diagram depicting the example machine FIG. 1 and components thereof.

FIG. 2 is a block diagram depicting machine 100 and a number of sub-systems thereof, including engine 200, implement 106, service brakes 202, one or more speed retarder systems 204, grade sensor 206, load sensor 208, speed control system (SCS) 210, and speed sensor 212. SCS 210 is configured to automatically control the speed of machine 100 under certain operating conditions thereof. As an example, SCS 210 can slow the rate of travel of machine 100 to zero speed and keep the machine stopped thereafter.

SCS 210 is, as depicted schematically in FIG. 2, communicatively connected to engine 200, retarder system(s) 204, grade sensor 206, load sensor 208, and speed sensor 212. SCS 210 can include software, hardware, and combinations of hardware and software configured to execute a number of functions related to automatically (e.g., without operator input) controlling the speed of machine 100. SCS 210 can be an analog, digital, or combination analog and digital controller including a number of components. As examples, SCS 210 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

SCS 210 may include storage media to store and/or retrieve data or other information, for example, signals from sensors. Storage devices, in some examples, are described as a computer-readable storage medium. In some examples, storage devices include a temporary memory, meaning that a principal purpose of one or more storage devices is not long-term storage. Storage devices are, in some examples, described as a volatile memory, meaning that storage devices do not maintain stored contents when the computer is turned off. Examples of volatile memories include random access memories (RAM), dynamic random access memories (DRAM), static random access memories (SRAM), and other forms of volatile memories known in the art. The data storage devices can be used to store program instructions for execution by processor(s) of SCS 210. The storage devices, for example, are used by software, applications, algorithms, as examples, running on and/or executed by SCS 210. The storage devices can include short-term and/or long-term memory, and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories.

SCS 210 can be configured to communicate with engine 200, retarder system(s) 204, grade sensor 206, load sensor 208, and speed sensor 212 via various wired or wireless communications technologies and components using various public and/or proprietary standards and/or protocols. In some examples, SCS 210 and other components of machine 100 will communicate over a local wired communication and/or power network of machine 100. However, SCS 210 can also be configured to communicate wirelessly. Additionally, SCS 210 can be configured to use various transport mediums and protocols for communicating with components of machine 100, including, for example, Ethernet, Transmission Control Protocol/Internet Protocol (TCP/IP), 802.11 or Bluetooth, or other standard or proprietary communication protocols.

Machine 100 includes one or more speed retarder systems 204. A speed retarder system is a system on-board a machine that can slow the rate of travel of the machine by retarding or counteracting kinetic energy of the machine, whether generated by, e.g., gravity or by the engine of the machine, independent of application of mechanical or electro-mechanical (e.g., electro-hydraulic) braking to slow or stop rotation of the wheels of the machine. Examples of speed retarder systems 204 include engine fan retarding, hydraulic pumps retarding, transmission retarding, engine retarding, exhaust retarding, among other examples.

Each of retarder system(s) 204 is capable of retarding an amount of energy of machine 100 to slow or otherwise control the speed at which the machine travels. As such, each retarder system 204 has a retarding capability, which is the amount of energy the retarder system can dissipate in one or more systems of machine 100 powering or transmitting power to propel the machine.

Machine 100 also includes grade sensor 206, load sensor 208, and speed sensor 212. Grade sensor 206 measures the grade or angle (e.g., relative to ground/horizontal) at which machine 100 is disposed. Grade sensor 206 can include a number of different types of sensors, including, for example, accelerometer, inclinometer, tilt sensor, or another sensor for determining incline, decline, change in elevation, slope, orientation, or grade of machine 100. Grade sensor 206 can also include a global positioning system, an external input regarding the grade of machine 100 at the current position of the machine, or an input from another source. The grade of machine 100 may be measured and/or expressed as a percentage (%) grade of rise divided by run, with 0% grade being a flat slope of zero and a 100% grade being a steep slope of 1 foot rise over 1 foot run (1/1), or a 45 degree slope.

In one example, grade sensor 206 includes an inertial measurement unit. For example, grade sensor 206 can include one or more 6-degree of freedom (6 DOF) IMUs. A 6 DOF IMU can include of a 3-axis accelerometer, 3-axis angular rate gyros, and may optionally include a 2-axis inclinometer. The 3-axis angular rate gyros may provide signals indicative of the pitch rate, yaw rate, and roll rate of the machine 100. The 3-axis accelerometer may provide signals indicative of the acceleration of the machine 100 in the x, y, and z directions. The IMUs can be configured to generate signals indicative of a change in position/orientation of machine 100. In one example, grade sensor 206, SCS 210 or another component of machine 100 can compute or derive the grade of the machine from angular rates and acceleration of the machine 100.

Load sensor 208 measures a load of machine 100. The load of machine 100 can include the weight of the machine and also the load or weight of an external load on the machine. For example, the load of machine 100 can include a fixed weight of the machine when not carrying or transporting any external materials like, for example, dirt or debris carried by bucket 112 of implement 106, plus the weight of dirt or other material carried by the implement. In some cases, the fixed, unloaded weight of machine 100 (sometimes referred to as "curb weight") is stored or input into systems of the machine, for example, into storage of SCS 210 and load sensor 208 measures and communicates the load on implement 106, which is added to the machine weight to determine the total load on the machine. Load sensor 208 can be a variety of sensors configured to measure force, including, for example, one or more load cells.

Speed sensor 212 measures a speed at which machine 100 travels. Speed sensor 212 can include a variety of different types of sensors located to measure machine 100 speed at various locations. In one example, speed sensor 212 is wheel speed sensor configured to measure the rotational speed of one or more wheels of machine 100. In another example, speed sensor 212 can be a gear tooth sensor, which is configured to, for example, measure rotations of a certain number of gear teeth of the transmission of machine 100 within a measured time period. More generally, speed sensor 212 can be a powertrain speed sensor, which is configured to measure the rotational speed of one or more components of the powertrain coupled to the engine of machine 100.

In an example, SCS 210 is configured to automatically determine a total braking force necessary to slow machine 100 to a stop and to command/control brakes 202 and/or retarder system(s) 204 to apply the braking force to stop the machine. As described above, there can be operational conditions of machine 100 under which it is advisable and/or beneficial to stop travel of machine 100. In such circumstances, SCS 210 can automatically, e.g. without requiring input from or interaction by an operator, determine a total braking force necessary to slow machine 100 to a stop based on a number of parameters and command/control brakes 202 and/or retarder system(s) 204 to apply the braking force to stop the machine.

For example, grade sensor 206 can measure, record and/or transmit signals indicative of the grade of machine 100 to SCS 210. Load sensor 208 can measure, record and/or transmit signals indicative of the load of machine 100. In some cases, the load of machine 100 can include a fixed machine weight without an external load plus a weight of any external load on the machine. SCS 210 can store and retrieve the fixed machine weight, or the fixed machine weight can be stored and/or determined by another component of machine 100 and communicated to SCS 210 along with a load measurement from load sensor, which measures a load on, for example, implement 106. Additionally, speed sensor 212 can measure, record and/or transmit signals indicative of the speed of machine 100 to SCS 210.

SCS 210 is configured to determine the total braking force based on a number of different parameter inputs, from which one or more braking force terms are determined. As an example in accordance with this disclosure, SCS 210 is configured to determine the total braking force as a sum of a feedforward braking force term (proportional term) and a closed loop braking force term (integral term). In an example, the feedforward braking force term can be a function of two additional terms, including a grade force and a deceleration force. The grade force can be a function of the force on the machine in the current conditions in which the machine is disposed, i.e. the force of gravity of the machine on a given grade of terrain.

In an example, SCS 210 receives or retrieves the weight of machine 100 from load sensor 208 and receives or retrieves the grade of machine 100 from grade sensor 206. SCS 210 determines the grade force based on the weight of machine 100 and the grade at which machine 100 is disposed. For example, SCS 210 receives one or more load signals from load sensor 208 indicative of a total weight of machine 100. SCS 210 receives one or more grade signals from grade sensor 206 indicative of the grade at which machine 100 is disposed. And, SCS 210 determines the grade force by calculating a fraction of the total weight of machine 100 in a direction of travel of the machine along a grade based on the one or more load signals received from load sensor 208 and the one or more grade signals received from grade sensor 206.

The deceleration force is the amount of force required to slow the machine to a stop at a given target rate, or, in other words, at a target deceleration. In an example, SCS 210 receives or retrieves the weight of machine 100 from load sensor 208. Additionally, SCS 210 can receive input indicating or retrieve from memory a target deceleration. The target deceleration will generally be a constant rate of speed reduction that machine 100 will be controlled to achieve by SCS 210 in order to slow the machine to a stop. SCS 210 determines the deceleration force based on the target deceleration and the weight of the machine 100. For example, SCS 210 can determine the mass of machine 100 based on the weight of machine 100 determined from signals received from load sensor 208. SCS 210 can then determine the deceleration force by multiplying the target deceleration by the mass of machine 100.

In an example, SCS 210 can initiate a control sequence on machine 100 by controlling/commanding services brakes 202 and/or retarder system(s) 204 to apply a total brake force equal to the feedforward braking force, which is equal to the grade force plus the deceleration force. However, the actual performance of machine 100 in slowing may vary from that expected and, as such, SCS 210 can implement the closed loop braking force term to correct for such variations. As an example, the amount of force actually delivered by services brakes 202 and/or retarder system(s) 204 may be different than that commanded by SCS 210. In such instances, the actual rate at which machine 100 is slowed will also diverge from the target deceleration and the closed loop braking force term can be used to account for such divergence to bring the actual deceleration of machine 100 closer to the target deceleration.

In an example, after initiating the control sequence by applying a braking force equal to the sum of the grade force and the deceleration force, SCS 210 can calculate a correction force. For example, SCS 210 can monitor the speed of machine 100 (periodically or continuously) over time and calculate the actual deceleration of machine 100. Additionally, SCS 210 can determine a deceleration error by comparing the actual deceleration of machine 100 to the target deceleration. After determining the deceleration error, SCS 210 can determine a force correction term based on the deceleration error. For example, in the event that the actual deceleration of machine 100 is less than the target deceleration, SCS 210 can apply a positive force correction to increase the total braking force applied by services brakes 202 and/or retarder system(s) 204. In the event that the actual deceleration of machine 100 is more than the target deceleration, however, SCS 210 can apply a negative force correction to decrease the total braking force applied by services brakes 202 and/or retarder system(s) 204.

In some cases, the determination of the force correction by SCS 210 can be tuned to optimize performance. For example, SCS 210 can be configured to ignore relatively small deceleration errors. At low speed and small errors, gains can be tuned out such that errors do not contribute to the closed loop force correction. When speed is high and/or speed error is high, gains can be increased to give response to the closed loop force correction to achieve the desired braking response, as described herein. In an example, gains can be increased in the closed loop force correction when speed error exceeds approximately 200 RPM/second or speed exceeds approximately 100 RPM.

In some examples, SCS 210 can base the total braking force applied by service brakes 202 and/or retarder system(s) 204 on a number of additional factors. For example, while SCS 210 is initiating or in the process of executing the control sequence to slow machine 100, the machine may be applying a propulsive force that is counteracting the braking/retarding being executed by SCS 210. In such instances, SCS 210 can add additional braking force to the total braking force applied by service brakes 202 and/or retarder system(s) 204 equal to the current propulsive force of machine 100. For example, as depicted in FIG. 2, machine 100 may also include a torque sensor 216, which is configured to generate signals indicative of the current torque output by engine 200 (or by a transmission or drivetrain of engine 200). SCS 210 can receive or retrieve the current torque output by machine 100 from torque sensor 216 and determine the current propulsive force of machine 100 based on the amount of torque output by the engine. Additionally, SCS 210 can control/command service brakes 202 and/or retarder system(s) 204 to apply a total brake force equal to the sum of the grade force, the deceleration force, the propulsive force, and the force correction.

Machine 100 also may exhibit an inherent resistance to traveling in the direction of travel or "rolling resistance," which can be based at least in part on the current drive gear of machine 100. The rolling resistance of machine 100 may cause machine 100 to slow slightly and therefore will affect the amount of braking force that SCS 210 needs to apply to slow machine 100 to a stop. Thus, referring again to FIG. 2, machine 100 can include gear select sensor 216, which is configured to determine a current drive gear of machine 100. SCS 210 can receive or retrieve the current drive gear of machine 100 from gear select sensor 216 and determine a rolling resistance of the machine based on the current drive gear of the machine. Additionally, in such instances, SCS 210 can control/command service brakes 202 and/or retarder system(s) 204 to apply a total brake force equal to the sum of the grade force, the deceleration force, the propulsive force, the rolling resistance, and the force correction.

In an example, SCS 210 continues the control sequence on machine 100 by controlling/commanding service brakes 202 and/or retarder system(s) 204 to apply a total brake force equal to the feedforward braking force plus the closed loop braking force, which is equal to the sum of grade force, the deceleration force, and the force correction (and in some instances the current propulsive force and the rolling resistance). As machine 100 is slowed to a stop, the force correction calculation is repeated by the closed loop control of SCS 210 and the total braking force applied by service brakes 202 and/or retarder system(s) 204 is thereby modulated to apply the appropriate amount of force to slow machine 100 at the target deceleration.

SCS 210 is monitoring the speed of machine 100 over time and can be configured to detect when the machine has slowed to zero speed (i.e. detect when the machine has come to a stop). For example, SCS 210 can receive or retrieve the speed of machine 100 from speed sensor 212. When SCS 210 receives a signal from speed sensor 212 indicating that machine 100 has slowed to zero speed, SCS 210 can be configured to further modulate the total braking force applied by service brakes 202 and/or retarder system(s) 204, as the force required is less than that required when the machine is moving. In an example, after detecting that machine 100 has slowed to zero speed, SCS 210 is configured to control/command service brakes 202 and/or retarder system(s) 204 to apply a total braking force equal to the grade force.

After SCS 210 detects that machine 100 has slowed to a stop and applies the grade force to maintain the machine safely at a stop, SCS 210 may require operator acknowledgement/input to restart movement of the machine. As an example, the operator may be required to change gears, e.g., placing machine 100 in a parking gear and then selecting a forward or reverse gear. As another example, the operator may be required to reselect throttle by depressing the throttle, releasing, and then depressing the throttle a second time to commence movement of machine 100.

SCS 210 can be configured to execute a number of additional functions related to slowing machine 100 to a stop. In an example, SCS 210 may be configured to limit power output by engine 200 in the course of executing the above described control sequences. For example, SCS 210 can be configured to limit throttle to engine 200. In an example, SCS 210 can be configured to limit throttle to engine 200 by inhibiting or completely stopping fuel delivered to the engine. Additionally, SCS 210 can be configured to detect when wheels of machine 100 lock-up and begin to slip on the terrain over which the machine is traveling. For example, speed sensor 212 can include a powertrain speed sensor, a sudden slowed output from which indicates that the powertrain and wheels connected thereto are no longer rotating. SCS 210 can therefore receive signals from speed sensor 212 and detect a sudden drop in the speed of machine 100, which can be indicative of one or more wheels of the machine locking and slipping on terrain. In such cases, SCS 210 can be configured to reduce the total brake force applied by service brakes 202 and/or retarder system(s) 204 to unlock the wheels and commence rotation once again.

SCS 210 and associated functions thereof can be implemented on machine 100 in a variety of ways. For example, SCS 210 can be implemented on one or more electronic control units (ECUs) of machine 100. An electronic control unit (ECU) can be an embedded system that controls machine electrical systems and/or other subsystems of the machine. Types of ECUs include Electronic/engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements coupled to and operable from the machine.

The ECUs of machine 100 can include, as an example, an Engine Control Module (ECM) associated with engine 200, an Implement Control Module (ICM) associated with implement 106, a Transmission Control Module (TCM), and a Brake Control Module (BCM) associated with service brakes 202. The ECUs of machine 100 can include software, hardware, and combinations of hardware and software configured to execute a number of functions attributed to the components in the disclosed examples. The ECUs of machine 100 can be an analog, digital, or combination analog and digital controllers including a number of components. As examples, the ECUs of machine 100 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The ECUs of machine 100 may include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, the ECM, ICM, TCM and/or BCM.

Additionally, the ECUs of machine 100 can be configured to communicate with one another and with other components of the machine via various wired or wireless communications technologies and components using various public and/or proprietary standards and/or protocols. Examples of transport mediums and protocols for electronic communication between components of machine 300 include Ethernet, Transmission Control Protocol/Internet Protocol (TCP/IP), 802.11 or Bluetooth, or other standard or proprietary transport mediums and communication protocols.

In an example, SCS 210 can be implemented on the TCU of machine 100. Load sensor 208 can be associated with and communicatively connected to the ICU of machine 100 and associated with implement 106. Additionally, speed sensor 212 can be associated with and communicatively connected to the ECU of machine 100 and torque sensor 214 and gear select sensor 216 can be associated with and communicatively connected to the TCU of machine 100.

In an example, SCS 210 executed on the TCU of machine 100 is configured to determine a total brake force equal to the sum of the grade force, the deceleration force, and the force correction. To determine the total grade force, SCS 210 executed on the TCU can receive or retrieve the grade of machine 100 from grade sensor 206, receive or retrieve the load of machine 100 from load sensor 208 communicated via the IMU, and monitor the speed of machine 100 based on signals from speed sensor 212 communicated via the ECU. Additionally, SCS 210 executed on the TCU may factor into the total braking force by accounting for the current propulsive force of machine 100, which SCS 210 can determine based on the current torque output by engine 200 from signals from torque sensor 214 also associated with the TCU. Moreover, SCS 210 can factor the rolling resistance of machine 100 into the total braking force determination and can determine the rolling resistance based on signals from the gear select sensor 216 associated with the TCU.

After determining the total braking force as the sum of the grade force, the deceleration force, and the force correction, and, in some cases, the propulsive force and the rolling resistance of machine 100, SCS 210 executed on the TCU can communicate with the BCU associated with service brakes 202. For example, SCS 210 can communicate the total braking force to the BCU and the BCU can control service brakes 202 (and, in some cases, retarder system(s) 204) to apply the total braking force to slow machine 100 to a stop.

Figure 3:
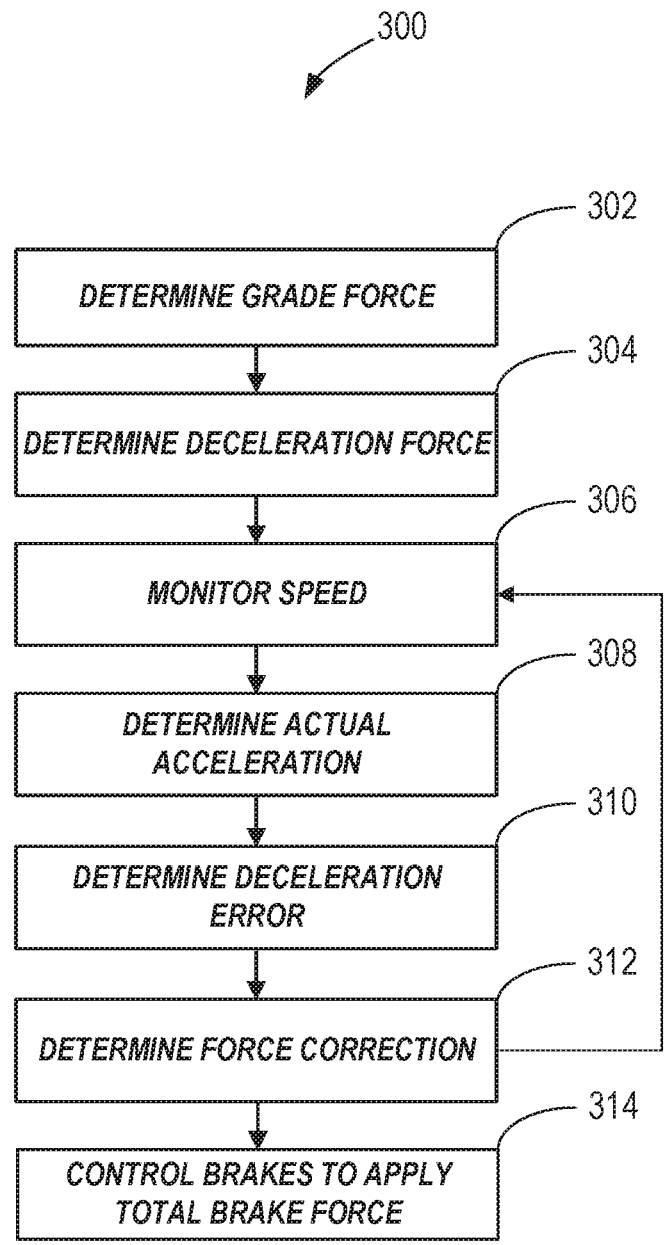
FIG. 3 is a flowchart depicting an example method of determining total braking force to stop a machine.

FIG. 3 is a flowchart depicting an example method of automatically slowing a work machine to a stop in accordance with this disclosure. In FIG. 3, method 300 includes determining a grade force based on a weight of the machine provided by a load sensor and a grade at which the machine is disposed provided by a grade sensor (302), determining a deceleration force based on a target deceleration and the weight of the machine (304), monitoring a speed at which the machine is traveling using a speed sensor (306), determining an actual deceleration of the machine based on the monitored speed at which the machine is traveling (308), determining a deceleration error based on a difference between the actual deceleration and the target deceleration (310), determining a force correction based on the deceleration error (312), and controlling a brake system to apply a total brake force equal to the sum of the grade force, the deceleration force, and the force correction.

The determination of the force correction is implemented in a closed loop control. As such, the method of FIG. 300 includes iteratively calculating the force correction after updating the actual acceleration based on the monitored speed and updating the acceleration error based on the updated actual acceleration and the target acceleration.

In some examples, the total braking force may include the propulsive force and the rolling resistance of the machine. In such cases, method 300 of FIG. 3 can include determining a propulsive force of the machine based on the amount of torque output by an engine provided by an engine torque sensor and controlling the brake system to apply a total brake force equal to the sum of the grade force, the deceleration force, the propulsive force, and the force correction. Additionally, method 300 can include determining a rolling resistance of the machine based on the current drive gear of the machine provided by a gear select sensor and controlling the brake system to apply a total brake force equal to the sum of the grade force, the deceleration force, the propulsive force, the rolling resistance, and the force correction.

INDUSTRIAL APPLICABILITY

In an operating example of a work machine according to this disclosure, the machine is moving toward an obstacle that the machine may collide with if it does not slow to a stop or otherwise avoid the obstacle. An operator of the machine, a technician on the work site, or an automated function of the machine detects the obstacle in the machine's path and initiates an automated control sequence to slow the machine to a stop. For example, a speed control system initiates a control sequence on the machine by controlling/commanding braking systems of the machine to apply a total brake force equal to a feedforward braking force term, which is equal to a grade force plus a deceleration force. However, the actual performance of the machine in slowing may vary from that expected and, as such, the speed control system implements a closed loop braking force term to correct for such variations.

In an example, after initiating the control sequence by applying a braking force equal to the sum of the grade force and the deceleration force, the speed control system calculates a correction force. The speed control system monitors the speed of the machine (periodically or continuously) over time and calculates the actual deceleration of the machine. Additionally, the speed control system determines a deceleration error by comparing the actual deceleration of the machine to the target deceleration. After determining the deceleration error, the speed control system determines a force correction term based on the deceleration error.

In an example, the speed control system continues the control sequence on the machine by controlling/commanding the braking systems to apply a total brake force equal to the feedforward braking force plus the closed loop braking force, which is equal to the sum of grade force, the deceleration force, and the force correction. As the machine is slowed to a stop, the force correction calculation is repeated by the closed loop control of the speed control system and the total braking force applied by braking systems is thereby modulated to apply the appropriate amount of force to slow the machine at the target deceleration.

As noted, the speed control system is monitoring the speed of the machine over time and can be configured to detect when the machine has slowed to zero speed (i.e. detect when the machine has come to a stop). After detecting that the machine has slowed to a stop, the speed control system further modulates the total braking force applied by the braking systems, as the force required is less than that required when the machine is moving. In an example, after detecting that the machine has slowed to zero speed, the speed control system is configured to control/command the braking systems to apply a total braking force equal to the grade force.

After the speed control system detects that the machine has slowed to a stop and applies the grade force to maintain the machine safely at a stop, the system requires operator acknowledgement/input to restart movement of the machine. As an example, the operator changes the drive gear of the machine by placing the machine in a parking gear and then selecting a forward or reverse gear.

The above detailed description is intended to be illustrative, and not restrictive. The scope of the disclosure should, therefore, be determined with references to the appended claims, along with the full scope of equivalents to which such claims are entitled.

What is claimed is:

1. A machine comprising:
   an engine;
   a brake system;
   a speed sensor configured to determine a speed at which the machine is traveling;
   a grade sensor configured to determine a grade at which the machine is disposed;
   a load sensor configured to determine a weight of the machine; and
   a controller in electrical communication with the engine, the brake system, the speed sensor, the grade sensor, and the load sensor, the controller:
   determining a grade force as a force induced by gravity along the grade and based on the weight of the machine and the grade at which the machine is disposed;
   determining a deceleration force needed to decelerate the machine at a desired rate of deceleration based on the weight of the machine;
   monitoring the speed at which the machine is traveling;
   determining an actual deceleration of the machine based on the monitored speed at which the machine is traveling;
   determining a deceleration error based on a difference between the actual deceleration and the desired rate of deceleration;
   determining a force correction based on the deceleration error; and
   controlling the brake system to apply a total brake force equal to the sum of the grade force, the deceleration force, and the force correction.

2. The machine of claim 1, further comprising an engine torque sensor configured to determine an amount of torque output by the engine, and wherein the controller is configured to:
   determine a propulsive force of the machine based on the amount of torque output by the engine; and
   control the brake system to apply a total brake force equal to the sum of the grade force, the deceleration force, the propulsive force, and the force correction.

3. The machine of claim 2, further comprising a gear select sensor configured to determine a current drive gear of the machine, and wherein the controller is configured to:
   determine a rolling resistance of the machine based on the current drive gear of the machine; and
   control the brake system to apply a total brake force equal to the sum of the grade force, the deceleration force, the propulsive force, the rolling resistance, and the force correction.

4. The machine of claim 1, wherein the controller is further configured to:
   receive one or more load signals from the load sensor indicative of a total weight of the machine;
   receive one or more grade signals from the grade sensor indicative of the grade at which the machine is disposed; and
   determine the grade force by calculating a fraction of the total weight of the machine in a direction of travel of the machine along a grade based on the one or more load signals and the one or more grade signals.

5. The machine of claim 1, wherein the controller is further configured to:
   monitor the speed at which the machine is traveling for a period of time; and
   calculate the actual deceleration of the machine as the rate of change of the speed of the machine over the period of time.

6. The machine of claim 1, wherein the load sensor is configured to measure or estimate the weight of the machine.

7. The machine of claim 1, wherein the load sensor is configured to estimate the weight of the machine and the load sensor comprises an inertial measurement unit (IMU), the IMU configured to measure acceleration of the machine and to estimate the weight of the machine based on an estimated mass of the machine and the measured acceleration.

8. The machine of claim 1, wherein the speed sensor comprises a wheel speed sensor.

9. The machine of claim 1, wherein the speed sensor comprises a powertrain speed sensor, and wherein the controller is configured to:
   detect a sudden drop in the speed of the machine indicative of one or more wheels of the machine locking and slipping on terrain; and
   reduce the total brake force applied by the brake system.

10. The machine of claim 1, wherein the controller is further configured to:
    determine that the machine speed has slowed to zero speed; and
    control the brake system to apply a total brake force equal to the grade force.

11. The machine of claim 1, wherein the controller is further configured to limit throttle to the engine.

12. The machine of claim 11, wherein the controller is configured to limit throttle to the engine by stopping or inhibiting fuel delivered to the engine.

13. The machine of claim 1, wherein the brake system comprises:
an electro-hydraulic machine brake system; and
one or more retarding systems.

14. The machine of claim 13, wherein controlling the brake system comprises controlling at least one of the electro-hydraulic machine brake system and the one or more retarder systems to apply a total brake force equal to the sum of the grade force, the deceleration force, and the force correction.

15. A method of automatically slowing a work machine to a stop, the method comprising:
determining a grade force as a force induced by gravity along the grade and based on a weight of the machine provided by a load sensor and a grade at which the machine is disposed provided by a grade sensor;
determining a deceleration force needed to decelerate the machine at a desired rate of deceleration based on the weight of the machine;
monitoring a speed at which the machine is traveling using a speed sensor;
determining an actual deceleration of the machine based on the monitored speed at which the machine is traveling;
determining a deceleration error based on a difference between the actual deceleration and the desired rate of deceleration;
determining a force correction based on the deceleration error; and
controlling a brake system to apply a total brake force equal to the sum of the grade force, the deceleration force, and the force correction.

16. The method of claim 15, further comprising:
determining a propulsive force of the machine based on the amount of torque output by an engine of the machine provided by an engine torque sensor; and
controlling the brake system to apply a total brake force equal to the sum of the grade force, the deceleration force, the propulsive force, and the force correction.

17. The method of claim 16, further comprising:
determining a rolling resistance of the machine based on the current drive gear of the machine provided by a gear select sensor; and
controlling the brake system to apply a total brake force equal to the sum of the grade force, the deceleration force, the propulsive force, the rolling resistance, and the force correction.

18. The method of claim 15, wherein determining the grade force comprises:
receiving one or more load signals from the load sensor indicative of a total weight of the machine;
receiving one or more grade signals from the grade sensor indicative of the grade at which the machine is disposed; and
determining the grade force by calculating a fraction of the total weight of the machine in a direction of travel of the machine along a grade based on the one or more load signals and the one or more grade signals.

19. The method of claim 15, wherein monitoring the speed comprises monitoring the speed at which the machine is traveling for a period of time, and wherein determining the actual deceleration comprises calculating the actual deceleration of the machine as the rate of change of the speed of the machine over the period of time.

20. The method of claim 15, wherein the speed sensor comprises a powertrain speed sensor, and further comprising:
detecting a sudden drop in the speed of the machine indicative of one or more wheels of the machine locking and slipping on terrain; and
reducing the total brake force applied by the brake system.

21. The machine of claim 15, further comprising:
determining that the machine speed has slowed to zero speed; and
controlling the brake system to apply a total brake force equal to the grade force.

22. The machine of claim 15, further comprising limiting throttle to the engine by stopping or inhibiting fuel delivered to the engine.

23. A machine comprising:
means for propelling the machine;
means for slowing travel of the machine;
means for determining a speed at which the machine is traveling;
means for determining a grade at which the machine is disposed;
means for determining a weight of the machine; and
means for controlling a speed of the machine, the means for controlling configured to:
determine a grade force as a force induced b gravity along the grade and based on the weight of the machine and the grade at which the machine is disposed;
determine a deceleration force needed to decelerate the machine at a desired rate of deceleration based on the weight of the machine;
monitor the speed at which the machine is traveling;
determine an actual deceleration of the machine based on the monitored speed at which the machine is traveling;
determine a deceleration error based on a difference between the actual deceleration and the the desired rate of deceleration;
determine a force correction based on the deceleration error; and
control the means for slowing travel of the machine to apply a total brake force equal to the sum of the grade force, the deceleration force, and the force correction.

24. The machine of claim 23, further comprising means for determining an amount of torque output by the engine, and wherein the means for controlling is configured to:
determine a propulsive force of the machine based on the amount of torque output by the engine; and
control the means for slowing travel of the machine to apply a total brake force equal to the sum of the grade force, the deceleration force, the propulsive force, and the force correction.

25. The machine of claim 24, further comprising means for determining a current drive gear of the machine, and wherein the means for controlling is configured to:
determine a rolling resistance of the machine based on the current drive gear of the machine; and
control the means for slowing travel of the machine to apply a total brake force equal to the sum of the grade force, the deceleration force, the propulsive force, the rolling resistance, and the force correction.

26. The machine of claim 23, wherein means for controlling is further configured to:
detect a sudden drop in the speed of the machine indicative of one or more wheels of the machine locking and slipping on terrain; and
reduce the total brake force applied by the means for slowing travel of the machine.

27. The machine of claim 23, wherein the means for controlling is further configured to:
   determine that the machine speed has slowed to zero speed; and
   control the means for slowing travel of the machine to apply a total brake force equal to the grade force.

28. The machine of claim 1, further comprising the controller repeatedly determining the deceleration error and the force correction and controlling the brake system based on the grade force, the deceleration force, and the force correction and in modulated fashion based on the repeated determination until the machine comes to a stop.

29. The method of claim 15, further repeatedly determining the deceleration error and the force correction and controlling the brake system based on the grade force, the deceleration force, and the force correction and in modulated fashion based on the repeated determination until the machine comes to a stop.

30. The machine of claim 23, further comprising the means for controlling a speed of a machine determining the deceleration error and the force correction and controlling the means for slowing travel of the machine based on the grade force, the deceleration force, and the force correction and in modulated fashion based on the repeated determination until the machine comes to a stop.

* * * * *